United States Patent
Webb et al.

(10) Patent No.: US 9,921,642 B2
(45) Date of Patent: *Mar. 20, 2018

(54) HAND-HELD CONTROLLERS FOR VIRTUAL REALITY SYSTEM

(71) Applicant: OCULUS VR, LLC, Menlo Park, CA (US)

(72) Inventors: James S. Webb, Seattle, WA (US); Benjamin E. Tunberg Rogoza, Seattle, WA (US); Peter Wesley Bristol, Seattle, WA (US); Jason Andrew Higgins, Seattle, WA (US); Sharvil Shailesh Talati, Seattle, WA (US); Yi-yaun Chen, Seattle, WA (US); Neil Warren Konzen, Hunts Point, WA (US)

(73) Assignee: OCULUS VR, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,436

(22) Filed: May 31, 2017

(65) Prior Publication Data
US 2017/0262048 A1    Sep. 14, 2017

Related U.S. Application Data

(63) Continuation of application No. 14/729,951, filed on Jun. 3, 2015, now Pat. No. 9,678,566.

(51) Int. Cl.
*A63F 9/24* (2006.01)
*G06F 3/01* (2006.01)
(Continued)

(52) U.S. Cl.
CPC .......... *G06F 3/011* (2013.01); *A63F 13/213* (2014.09); *A63F 13/2145* (2014.09);
(Continued)

(58) Field of Classification Search
None
See application file for complete search history.

(56) References Cited

U.S. PATENT DOCUMENTS 6,811,491 B1    11/2004  Levenberg et al.
8,469,824 B1 *  6/2013  Farley ................... F41J 5/02
                                                 434/11

(Continued)

OTHER PUBLICATIONS

Seth Colaner, Rescape Kickstarter Project Overlays Augmented Reality FPS Game on Your Surroundings With a Mobile Device, Mar. 20, 2014, https://hothardware.com/news/rescape-kickstarter-project-overlays-augmented-reality-fps-game-on-your-surroundings-with-a-mobile-device.*

(Continued)

*Primary Examiner* — Jason Yen
(74) *Attorney, Agent, or Firm* — Morgan, Lewis & Bockius LLP

(57) ABSTRACT

A hand-held controller includes a user-input surface, a grip coupled to the user-input surface, and a cage coupled to the user-input surface at two points without the grip interposed between the user-input surface and the cage. The hand-held controller includes may further include a plurality of illumination sources on an outer surface of the cage.

18 Claims, 3 Drawing Sheets

(51) Int. Cl.
*G06F 3/0488* (2013.01)
*A63F 13/24* (2014.01)
*A63F 13/2145* (2014.01)
*A63F 13/213* (2014.01)
*G06F 3/0489* (2013.01)
*G02B 27/01* (2006.01)

(52) U.S. Cl.
CPC ............ *A63F 13/24* (2014.09); *G06F 3/0488* (2013.01); *G06F 3/0489* (2013.01); *A63F 2300/1043* (2013.01); *G02B 2027/0132* (2013.01); *G02B 2027/0138* (2013.01); *G02B 2027/0156* (2013.01); *G02B 2027/0178* (2013.01)

(56) References Cited

U.S. PATENT DOCUMENTS

| | | | | |
|---|---|---|---|---|
| 2010/0045607 A1* | 2/2010 | Kuwaki | ............... | A63F 13/02 345/169 |
| 2011/0159959 A1* | 6/2011 | Mallinson | ............. | A63F 13/235 463/37 |
| 2011/0294579 A1* | 12/2011 | Marks | ................... | G06F 3/0304 463/36 |
| 2012/0088582 A1* | 4/2012 | Wu | ....................... | A63F 13/211 463/37 |
| 2013/0324254 A1 | 12/2013 | Huang et al. | | |
| 2014/0228124 A1 | 8/2014 | Plagge et al. | | |
| 2015/0258431 A1* | 9/2015 | Stafford | ................ | A63F 13/213 463/31 |
| 2015/0258432 A1 | 9/2015 | Stafford et al. | | |

OTHER PUBLICATIONS

Ben Lang, Sixense STEM VR Motion Controller Kickstarter is Live, Sep. 12, 2013, https://www.roadtovr.com/sixense-stem-vr-motion-controller-kickstarter-prices-149-tiers/.*

Ben Lang, Sixense STEM Update, Nov. 27, 2013, from http://www.roadtovr.com/sixense-stem-update-pre-order-black-Friday-sale-prototype-colors/, 3 pgs.

Kickstarter, STEM System: The Best Way to Interact with Virtual Worlds, Feb. 9, 2015, from https://www.kickstarter.com/projects/89577853/stem-system-the-best-way-to-interact-with-virtual-worlds, 10 pgs.

Tactical Haptics, Sneak Peek at New Reactive Grip Motion Controller, Oct. 11, 2013, from http://tacticalhaptics.com/new-reactive-grip-motion-controller/, 1 pg.

Webb, Office Action, U.S. Appl. No. 14/729,951, dated Jan. 4, 2017, 12 pgs.

Webb, Notice of Allowance, U.S. Appl. No. 14/729,951, dated Apr. 17, 2017, 8 pgs.

\* cited by examiner

HAND-HELD CONTROLLERS FOR VIRTUAL REALITY SYSTEM

RELATED APPLICATION

This application is a continuation of U.S. application Ser. No. 14/729,951, filed Jun. 3, 2015, entitled "Hand-Held Controllers for Virtual Reality System," which is incorporated by reference herein in its entirety.

TECHNICAL FIELD

This application relates generally to gaming entertainment and virtual reality systems, and more specifically to hand-held controllers capable of being sensed or tracked by an image capturing device of a virtual reality system in order to detect a user's hand movements.

BACKGROUND

Gaming entertainment systems typically include a hand-held controller, game controller, or other controller. A user manipulates the controller to send commands or other instructions to the gaming entertainment system to control a video game or other simulation. For example, the controller may be provided with several buttons or knobs operated by the user, such as a joystick.

Conventional gaming controllers typically merely provide buttons or knobs for operation by the user, where each of the buttons or knobs corresponds to a desired action to be carried out on a display of the gaming entertainment or virtual reality system. The action carried out on the screen is not representative of a motion that the user is physically making, and therefore has less of a feeling of "reality" to the user. As such, conventional controllers lack capability of being tracked to simulate actual motion of a user holding the controller and enhance the user virtual reality experience.

SUMMARY

Accordingly, there is a need for hand-held controllers capable of being tracked to simulate actual motion of a user holding the controller, thereby enhancing the user virtual-reality experience.

In accordance with some embodiments, a hand-held controller for a virtual reality system includes a user-input surface, a grip coupled to the user-input surface, and a cage coupled to the user-input surface. The cage includes a plurality of illumination sources on an outer surface of the cage. The user-input surface has a first user-input key.

In some embodiments, the grip is integrally formed with the user-input surface.

In some embodiments, the grip is slanted at an angle with respect to the user-input surface.

In some embodiments, the hand-held controller further includes a structural web coupling the cage to the user-input surface.

In some embodiments, the hand-held controller further includes a second user-input key mounted at least in part on the structural web.

In some embodiments, the plurality of illumination sources includes a plurality of light-emitting diodes (LEDs).

In some embodiments, the hand-held controller further includes a power source to supply power to the user-input surface and the plurality of LEDs.

In some embodiments, the plurality of illumination sources includes a plurality of passive reflectors.

In some embodiments, the first user-input key is selected from the group consisting of a thumbstick, a button, a trigger, and a directional pad.

In some embodiments, the first user-input key is a button selected from the group consisting of an A or X button, a B or Y button, a start button, a back button, a forward button, and a home button.

In some embodiments, the user-input surface includes a plurality of user-input keys including the first user-input key, and respective user-input keys of the plurality of user-input keys are selected from a group consisting of a thumbstick, a button, a trigger, and a directional pad.

In some embodiments, the hand-held controller further includes a trigger mounted on the grip at a position configured to be actuated by a middle finger of a user.

In some embodiments, at least a portion of the plurality of illumination sources are positioned to be visible to a forward-looking camera on a head-mounted display worn by a user when the user holds the grip in a neutral position.

In some embodiments, at least a portion of the plurality of illumination sources are positioned to face away from a user when the user holds the grip in a neutral position.

In some embodiments, the cage is configured to be positioned above a user's hand when the user holds the grip in a neutral position.

In some embodiments, the user-input surface forms an inner front surface of the cage.

In some embodiments, the user-input surface includes a plurality of user-input keys including the first user-input key, and the user-input surface is a touch-sensitive surface partitioned into a plurality of sections, each section corresponding to a respective user-input key of the plurality of user-input keys and including at least one touch sensor to detect a touch on the corresponding section.

In some embodiments, the cage is detachably coupled to at least one of the user-input surface and the grip.

In some embodiments, the cage and/or grip comprise an over-molded rubber material or a hard plastic.

In some embodiments, a hand-held controller for a virtual reality system includes a body comprising a touch-sensitive user-input surface and a grip. The touch-sensitive user-input surface is partitioned into a plurality of sections, in which each section corresponds to at least one user-input function. The grip is coupled to the touch-sensitive user-input surface and slanted at a predetermined angle in a vertical direction from the touch sensitive user input surface. The hand-held controller further includes a cage coupled to the body, a structural web coupling the cage to the body, and a power source configured to supply power to the body and cage. The cage includes a plurality of illumination sources on an outer surface of the cage.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1:
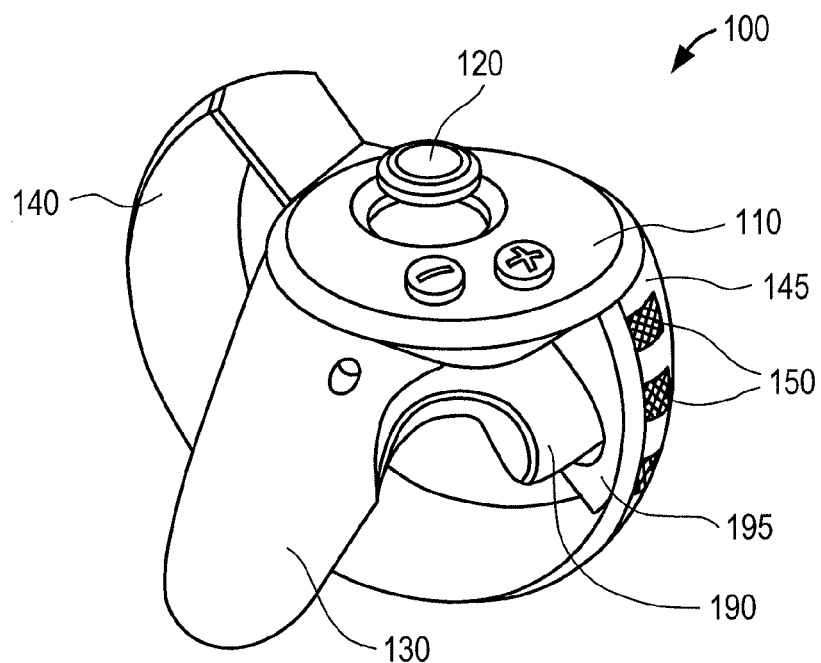
FIG. 1 illustrates an isometric view of an exemplary hand-held controller in accordance with some embodiments.

Hand-held controllers are typically held in one or both hands by a user while playing a video game or carrying out some other virtual reality activity in order to operate the user-input keys (e.g., buttons) on the controller. While playing the game or carrying out the virtual reality activity, the user may become so immersed in the game as to move their hands in a manner mimicking a desired action (e.g., performed by pressing one of the buttons while holding the controller). For example, during playing a boxing game a user may press an "L" button corresponding to a left hand punch while simultaneously jerking their left hand for a more real sensation. It is desirable to display a corresponding motion by an image subject on the screen.

Accordingly, the present disclosure describes hand-held controllers configured to allow easy tracking of their movements. The sensed movements of the hand-held controllers may be used as additional commands to control various aspects of the game or other simulation being played.

In some embodiments a hand-held controller includes illumination sources coupled to a surface of the controller (e.g. the cage, described below). The illumination sources are configured to emit or reflect light which is detectable by an image capturing device (e.g. a camera) used in conjunction with a head-mounted display in a virtual reality system. Motion of the illumination sources on the controller may be detected and used to model actions of the user's hand(s) in the virtual reality system. Various motions of the hand-held controller may be detectable, such as punching movements, throwing movements, hitting movements when playing a sport, and the like. Motions of the hand-held controller correspond to various commands such that the motions are transferred into actions in the virtual reality system.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user-input key could be termed a second user-input key, and, similarly, a second user-input key could be termed a first user-input key, without departing from the scope of the various described embodiments. The first user-input key and the second user-input key are both user-input keys, but they are not the same user-input key.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 2:
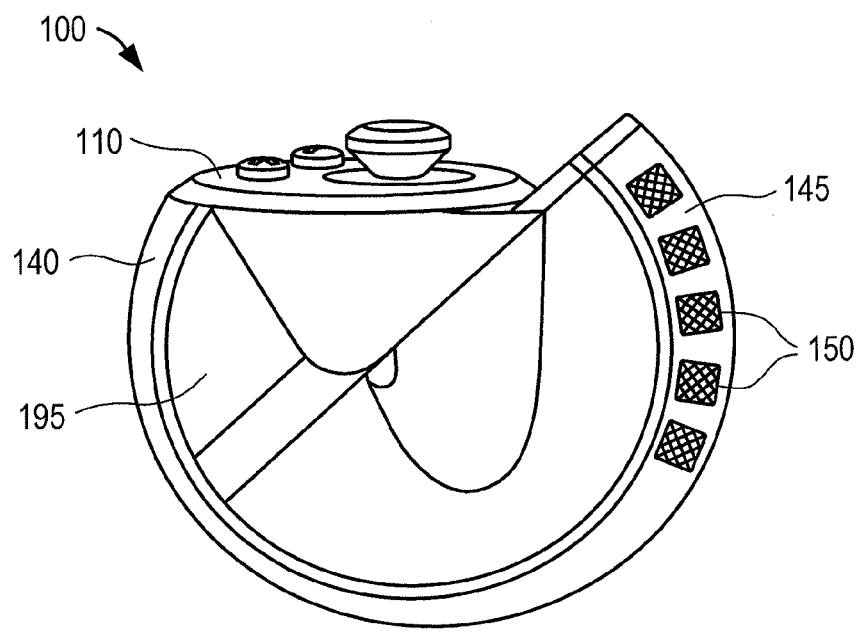
FIG. 2 illustrates another isometric view of exemplary hand-held controller in accordance with some embodiments.

FIGS. 1 and 2 illustrate a hand-held controller 100 in accordance with some embodiments. The hand-held controller 100 generally comprises a user-input surface 110, a grip 130 coupled to the user-input surface 110, and a cage 140 coupled to the user-input surface 110 and including a plurality of illumination sources 150 on an outer surface 145 of the cage 140.

The user-input surface 110 includes a plurality of user-input keys 120. Alternatively, the user-input surface includes a single user-input key. A user-input key is a button, knob, switch, thumbstick, directional pad, or any other such part that a user presses or manipulates in some other way to carry out a specific action in a virtual reality system (e.g., during gaming). In the example of FIGS. 1 and 2, the user input keys 120 include a thumbstick 120C and buttons 120A and 120B. Thus, the user-input surface 110 is a surface on the controller where the user delivers an input by activating one or more user-input keys (e.g., by pressing a button or pushing a knob) corresponding to an action that the user desires to carry out in the virtual reality system.

Each of the user-input keys is configured to communicate with the virtual reality system so as to translate an operation of the user-input key by the user into a corresponding action in the virtual reality system.

In some embodiments, a first user-input key may be selected from the group consisting of a thumbstick, a button, a trigger, and a directional pad.

In some embodiments, the first user-input key may be the button selected from the group consisting of an A or X button, a B or Y button, a start button, a back button, a forward button, and a home button. The A or B buttons may correspond to a selection action between at least two choices presented to the user in the gaming system. The X or Y button may correspond to a negative or affirmative decision to be made by the user dictating how the image subject will proceed in the game. X may correspond to an action of "NO" or "END" and Y may correspond to "YES" or "PROCEED/CONTINUE." The start button may be a button activated by the user to begin the virtual-reality (e.g., gaming) experience, and the back and forward buttons may indicate a direction in which the user desires the image subject to move. The home button may be a button activated to return the gaming experience back to a main menu or to start the game or activity from the beginning.

In some embodiments, the user-input surface 110 includes a plurality of user-input keys including the first user-input key, and respective user-input keys of the plurality of user-input keys are selected from a group consisting of a thumbstick, a button, a trigger, and a directional pad.

In some embodiments, the home button is positioned further away from the other user-input keys. This configuration would allow for user-input keys that are used most (e.g. a directional pad used to dictate a direction of movement of the image subject, e.g., up-down-left-right) to be placed closer to the vicinity of the fingers and thumb. This configuration provides the advantage that the user would need to reach less to press the more frequently used user-input keys, thereby mitigating the possibility of ergonomic ailments associated with overreaching and overstretching fingers.

Figure 4:
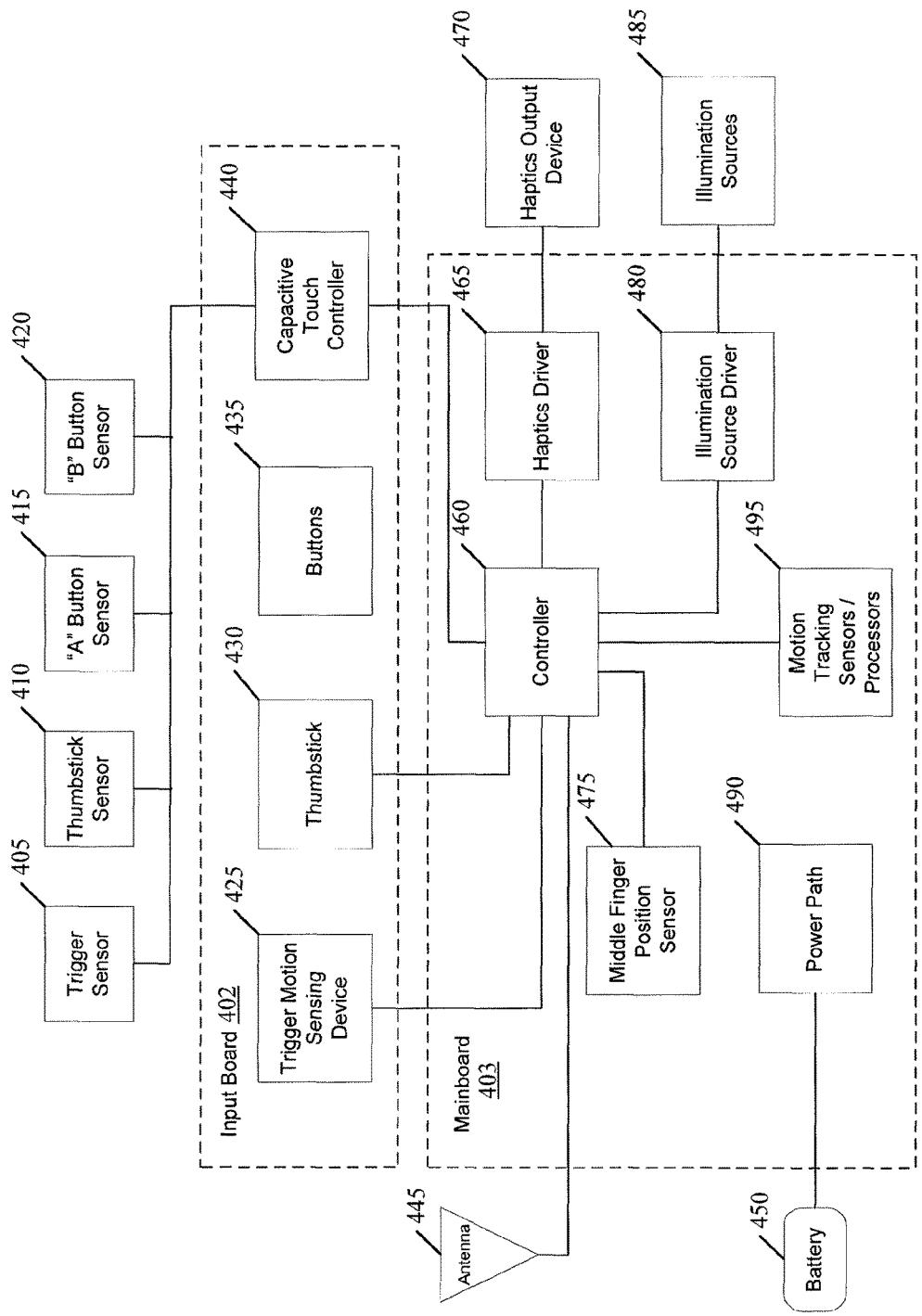
FIG. 4 is a block diagram illustrating an electrical configuration of the exemplary hand-held controller in accordance with some embodiments.

In some embodiments, at least a portion of the user-input surface 110 is a touch-sensitive surface partitioned into a plurality of sections. Each section corresponds to a respective user-input key of the plurality of user-input keys. In this configuration, at least one touch sensor is positioned on a bottom surface of the user-input surface 110, as illustrated in FIG. 4, to detect a touch on the corresponding section. When a touch of a key by the user is detected by the sensors, the action associated with the corresponding user-input key touched is translated to an action of the subject image in the virtual reality system.

In some embodiments, the grip 130 is coupled to the user-input surface 110. The grip 130 is a protruding structure of the controller 100 which the user grips in one hand to hold the controller. This configuration allows for the user to be able to grip the controller 100 between a palm and fingers (e.g., three or less fingers) while freeing up the thumb and, in some embodiments, another finger (e.g. the middle finger), for operating the user-input keys. In some embodiments, the middle finger is freed to operate a trigger 190 mounted at least in part on the grip 130 as shall be described below.

In some embodiments the grip 130 is a separate part of the controller 100 that is removably coupled to the user input surface 110. The grip 130 and the user-input surface may be coupled by a method appropriate for their materials of construction. For example, the grip and user-input surface 110 may be formed of a hard plastic and may be coupled to each other by ultrasonic welding. Alternatively, the grip 130 and the user-input surface 110 may be coupled to each other by a fastening mechanism such as a screw or a bolt, or may be threadedly engaged with each other.

In some embodiments, the grip 130 is integrally formed with the user-input surface 110 as one part (e.g., which may be formed from molding).

The grip is slanted at a predetermined angle with respect to the user-input surface (e.g., with a plane through the user-input surface or a portion thereof) in order to provide a comfortable (e.g., optimum) ergonomic balance for a user between holding the grip in and using a thumb to operate the at least one user-input key.

In some embodiments, the cage 140 is coupled to the user-input surface 110. The cage 140, which may also be referred to as a tracking cage, has a surface (e.g., an outer surface) on which a plurality of illumination sources 150 are positioned. The illumination sources 150 are positioned to be visible to an external image-capture device (e.g., camera), which detects movement of the illumination sources 150 when a user makes a motion (e.g., waving, swinging, punching, shaking, or any other hand motion) while holding the grip 130 of the controller. In some embodiments, the cage is positioned such that it is located above the user hand when the user holds the grip 130 in a neutral position. Given this orientation, the outer surface 145 is visible to an image-capturing device (e.g., a forward-looking camera 310 on a head-mounted display 300 worn by the user, or alternatively an external camera separate from the head-mounted display). A neutral position refers to when users hold the controller 100 in front of them with the grip 130 between palm and fingers and otherwise relax their arms and wrists.

In the example of FIGS. 1 and 2, the user-input surface 110 is outward-facing with respect to the cage 140. Alternatively, the user-input surface may be inward-facing with respect to the cage. For example, in some embodiments the user-input surface 110 forms an inner front surface of the cage 140 or is contiguous with the inner surface of the cage 140.

Figure 3:
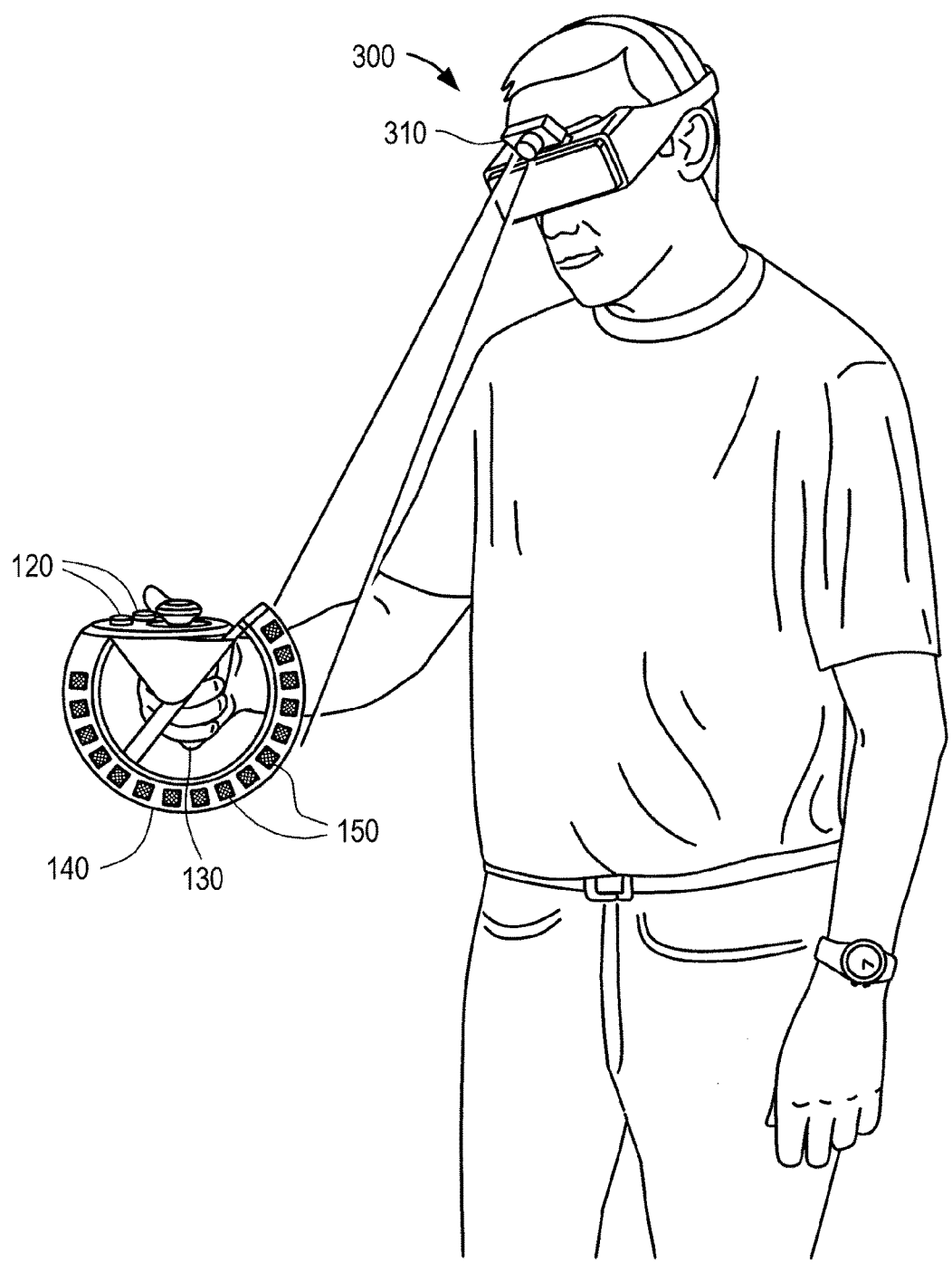
FIG. 3 illustrates an exemplary hand-held controller used in conjunction with a head-mounted display and front-facing camera in accordance with some embodiments.

FIG. 3 illustrates the hand-held controller 100 used in conjunction with a head-mounted display 300 that has a front-facing (i.e., forward-looking) camera 310 in accordance with some embodiments. The forward-looking camera 310 is positioned on the head-mounted display 300 (e.g., at a downward facing angle) such that the cage 140 is within view when the user holds the grip 130 in the neutral position. Furthermore, at least a portion of the illumination sources 150 are positioned on the cage 140 such that they are visible to the forward-looking camera 310 when the user holds the grip 130 in the neutral position. This way, the camera 310 is able to sense and detect a position of the controller 100 based on light emitted or reflected by at least one of the plurality of illumination sources 150 as described below.

Alternatively, or in addition, an external image-capture device (e.g., camera) is positioned in front of the user. At least a portion of the illumination sources 150 are positioned on the cage 140 such that they face away from the user, and thus are visible to the external image-capture device, when the user holds the grip 130 in the neutral position.

In some embodiments, the illumination sources 150 are light emitting diodes (LEDs). In some embodiments, the LEDs are infrared (IR) LEDs. The LEDs may be positioned on the surface (e.g., outer surface 145) of the cage 140 in any suitable pattern, order, or array. For example, they may be positioned linearly, in a circular pattern, a rectangular pattern, a hexagonal pattern, or any other desired pattern to provide visibility to the camera 310. The LEDs may be fixedly or detachably positioned on the cage by any appropriate method. For example, the LED's may be mounted on or embedded within the surface (e.g. outer surface 145) of the cage 140. Alternatively, the LEDs may be on a sleeve that surrounds the cage 140 and effectively forms the outer surface 145 of the cage 140. Although the LEDs are described as being positioned on the outer 145 surface of the cage 140, they may additionally or alternatively be coupled to any other surface on the cage 140 and/or the rest of the controller 100. Additionally, the illumination sources 150 may be another type of illumination source (e.g., passive reflectors).

The LEDs are electrically connected to a power source which may or may not be same power source providing power to the user-input surface 110. The controller may be wireless; therefore, the power source may be one or more batteries. The LEDs may be housed in diffused cases including a current limiting resistor to keep the current from the power source to the LED below the LED's maximum current rating so as to ensure maximum life of the LEDs. The LEDs may be activated when a suitable voltage is applied. By virtue of the LEDs being positioned in an area on the controller 100 detectable to the camera 310, motion of the light produced by the LEDs that is detected by the camera 310 is used as an indication of the positions and motion of the controller 100. In this way, motion of the controller is tracked by the camera, allowing for corresponding virtual-reality hand motions to be shown. For example, when the user makes a punching motion while playing a boxing game, movement of the LEDs in a manner corresponding to a punch may be detected and used to model the user's motion.

In some embodiments, the grip 130 and/or cage 140 may be formed of an over-molded rubber material (e.g., so as to provide a surface providing sufficient friction with a user's palm thus improving the grip). In some embodiments, the grip 130 and/or cage 140 may be formed of a hard plastic, including, but not limited to high density polyethylene providing increased rigidity in structure. Additionally, any other suitable materials may be used.

In some embodiments, the cage 140 may be detachably coupled to at least one of the user-input surface 110 and the grip 130. The cage 140 may be slidably coupled to the user-input surface 110 through a protrusion spanning a width of each end portion of the cage 140 being slidably engaged with a corresponding groove positioned on an outer circumference of the user-input surface 110. This configuration yields the advantage of separating the aforementioned components for calibration as necessary. Detachable coupling of the components also allows for a separate and potentially cheaper manufacturing process of the parts. Furthermore, detachable coupling of the cage 140 to at least one of the user-input surface 110 and the grip 130 allows for separation thereof upon dropping of the controller 100, thereby reducing the need to replace the entire unit upon damage, but instead focus on fixing/replacing the separate damaged part.

In some embodiments, as illustrated in FIG. 2, the controller 100 may further comprise a structural web 195 coupling the cage 140 to the user-input surface 110. The large structural web 195 provides further rigidity in structure to the coupling between the cage 140 and the user-input surface 110 to mitigate damage and separation of these components upon dropping of the controller 100 by the user.

In some embodiments, a trigger 190 is mounted at least in part on the structural web 195. That is, the trigger 190 may be mounted between the structural web 190 and the grip 130. The aforementioned configuration yields the advantage that the trigger is positioned adjacent to a location of a user's finger (e.g., middle finger) when the grip 130 is held in the neutral position. In some embodiments, the trigger may be both pushed and pulled by the middle finger, thus providing increased control in manipulating the trigger to achieve a desired action. The trigger 190 is an example of a user-input key.

FIG. 4 is a block diagram illustrating an electrical configuration of an exemplary hand-held controller (e.g., controller 100) in accordance with some embodiments. The hand-held controller includes an input board 402 and a main board 403 coupled to the input board 402. The input board 402 includes a trigger motion sensing device 425, a thumbstick 430, buttons 435, and a capacitive touch controller 440. In other examples, the input board 402 may include additional or alternative user-input keys. The trigger motion sensing device 425 detects user activation of a trigger (e.g., trigger 190).

The capacitive touch controller 440 is coupled to multiple sensors such that the input board 402 receives sensed signals from capacitive sensors resulting from a user's touch. For example, the capacitive sensors include a trigger sensor 405, a thumbstick sensor 410, an "A" button sensor 415, and/or a "B" button sensor 420. For example, the trigger sensor 405 may sense when a user touches the trigger. Similarly, the thumbstick sensor 410 senses a signal resulting from the user touching the thumbstick 410. Further, the button sensors 415 and 420 senses signals resulting from user touching the buttons 415 and 420. Other capacitive sensors may be included for other user-input keys (e.g., a directional pad).

The mainboard 403 includes a controller 460, a haptics driver 465, a middle finger position sensor 475, power path 490, motion tracking sensors/processors 495 and an illumination source driver 480. The haptics driver 465 drives a haptics output device 470 that provides haptic effects. An example of the haptics output device 470 includes a short vibration feedback device that, when activated, causes the hand-held controller to vibrate.

The mainboard 403 may be coupled to an antenna to wirelessly receive and transmit signals. The hand-held controller (e.g., controller 100) thus may be wireless. The mainboard 403 may also be coupled to a power source (e.g., a battery 450) to provide power supply to the hand-held controller. The power may be supplied to the mainboard 403 through a power path 490.

The illumination source driver 480 (e.g., LED driver) drives illumination sources 485 (e.g., LEDs on the outer surface of the cage 140) under the control of the controller 460, and thus turns the illumination sources 485 on or off.

The middle finger position sensor 475 senses a position of the middle finger (e.g. when a user activates the trigger 190) and this information is processed by the controller 460. The motion tracking sensors/processors 495 include a plurality of motion sensors (e.g. accelerometers and/or gyroscopes) which tracks motion of the controller based on motions made by the user.

Some embodiments are directed to two controllers—one to be held in each of a user's hands. In some embodiments, the two controllers may be identical, but for a position of at least one of the user-input keys, so as to be adapted specifically for either a left or right hand in which the controller is to be held. The first controller thus may be a right-handed controller and the second controller may be a left-handed controller. In other embodiments, the two controllers may be agnostic with respect to handedness (e.g., with both controllers having the same configuration of user-input keys, or with one controller having a configuration of user-input keys different than the other).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A hand-held controller, comprising:
   a user-input surface;
   a grip coupled to the user-input surface; and
   a cage coupled to the user-input surface at two points without the grip interposed therebetween.

2. The hand-held controller of claim 1, further comprising a plurality of illumination sources on an outer surface of the cage.

3. The hand-held controller of claim 2, wherein the plurality of illumination sources comprises a plurality of light-emitting diodes (LEDs).

4. The hand-held controller of claim 3, further comprising a power source to supply power to the user-input surface and the plurality of LEDs.

5. The hand-held controller of claim 2, wherein the plurality of illumination sources comprises a plurality of passive reflectors.

6. The hand-held controller of claim 2, wherein at least a portion of the plurality of illumination sources are positioned to be visible to a forward-looking camera on a head-mounted display worn by a user when the user holds the grip in a neutral position.

7. The hand-held controller of claim 2, wherein at least a portion of the plurality of illumination sources are positioned to face away from the user when the user holds the grip in the neutral position.

8. The hand-held controller of claim 1, wherein the user-input surface includes a first user-input key.

9. The hand-held controller of claim 8, wherein the first user-input key is one of a thumbstick, a button, a trigger, or a directional pad.

10. The hand-held controller of claim 9, wherein the first user-input key is a button selected from the group consisting of an A or X button, a B or Y button, a start button, a back button, a forward button, and a home button.

11. The hand-held controller of claim 8, wherein:
the user-input surface comprises a plurality of user-input keys including the first user-input key; and
the plurality of user-input keys includes at least one of a thumbstick, a button, a trigger, or a directional pad.

12. The hand-held controller of claim 1, wherein the cage has a ring shape.

13. The hand-held controller of claim 1, wherein the grip is integrally formed with the user-input surface.

14. The hand-held controller of claim 1, wherein the grip is slanted at an angle with respect to the user-input surface.

15. The hand-held controller of claim 1, further comprising a structural web coupling the cage to the user-input surface.

16. The hand-held controller of claim 15, further comprising a trigger mounted in the structural web.

17. The hand-held controller of claim 1, wherein the cage is configured to be positioned above a user's hand when the user holds the grip in a neutral position.

18. The hand-held controller of claim 1, wherein the cage is detachably coupled to the user-input surface through a slidable engagement.

* * * * *